United States Patent [19]

Guenthner et al.

[11] Patent Number: 5,195,101
[45] Date of Patent: Mar. 16, 1993

[54] EFFICIENT ERROR DETECTION IN A VLSI CENTRAL PROCESSING UNIT

[75] Inventors: Russell W. Guenthner; Bruce E. Flocken; Ronald E. Lange, all of Glendale, Ariz.

[73] Assignee: Bull HN Information Systems Inc., Phoenix, Ariz.

[21] Appl. No.: 546,204

[22] Filed: Jun. 28, 1990

[51] Int. Cl.$^5$ ............................................. G06F 15/40
[52] U.S. Cl. ............................................. 371/68.3
[58] Field of Search ............ 371/68.3, 68.1, 21.5, 371/16.1, 16.4, 16.5; 364/200 MS File

[56] References Cited

U.S. PATENT DOCUMENTS

| | | | |
|---|---|---|---|
| 4,217,486 | 8/1980 | Tawfik et al. | 371/68.3 |
| 4,358,823 | 11/1982 | McDonald et al. | 371/68.3 |
| 4,811,215 | 3/1989 | Smith | 364/200 |
| 4,849,979 | 7/1989 | Maccianti et al. | 371/68.3 |
| 4,916,696 | 4/1990 | Funakubo | 371/68.3 |
| 4,953,164 | 8/1990 | Asakura et al. | 371/40.2 |

Primary Examiner—Robert W. Beausoliel
Assistant Examiner—Phung My Chung
Attorney, Agent, or Firm—J. H. Phillips; J. S. Solakian

[57] ABSTRACT

In a Central Processing Unit (CPU) incorporating a Basic Processing Unit (BPU) which includes an address and execution (AX) unit, a decimal numeric (DN) unit and a floating point (FP) unit and also incorporating a cache unit situated logically intermediate the BPU and system memory, BPU data manipulation errors are sensed by duplicating each of the AX, DN and FP chips (i.e., duplicating the BPU) and performing all BPU data manipulation operations redundantly. The outputs from the duplicate BPUs are placed on respective master (MRB) and slave (SRB) result busses which are coupled to the cache unit, and the results are compared, byte-by-byte in the cache unit. If the results are not identical in each byte of the result, the individual chip handling the byte in the cache unit and detecting the no-compare condition issues an individual error signal, and appropriate steps to remedy or otherwise respond to the error signal may be undertaken within the cache unit, within the CPU and within the system.

9 Claims, 4 Drawing Sheets

EFFICIENT ERROR DETECTION IN A VLSI CENTRAL PROCESSING UNIT

FIELD OF THE INVENTION

This invention relates to information processing systems and, more particularly, to efficient error detection in the results obtained from a basic processing unit of a Very Large Scale Integrated (VLSI) circuit Central Processing Unit (CPU).

BACKGROUND OF THE INVENTION

In the design of a mainframe CPU employing VLSI technology, it is desirable to limit the number of different types of VLSI chips employed in order to contain the design task within manageable bounds. However, it is also highly desirable to provide powerful and reliable error detection and handling features, and this requirement has mandated the provision of various circuits, firmware and software to sense and resolve the diverse types of errors which may occur in operation. Among the possible error conditions encountered in a VLSI central processing unit are those in which a basic processing unit (BPU) in executing an instruction such as a routine data manipulation such as calculating, simply reaches an incorrect result. It can be shown that employing built-in error detection in the circuitry of a BPU results in both a doubling of the types of chips required and a doubling of the number of chips required as well as the necessity of incorporating precharge circuit techniques. This effect not only significantly extends the design effort required to develop a BPU, but also increases the "real estate" or space occupied by the BPU and its support circuitry and consequently that of the CPU.

OBJECTS OF THE INVENTION

It is therefore a broad object of this invention to provide improved error detection capability in a VLSI central processing unit.

It is a more specific object of this invention to provide improved error detection capability for sensing an error condition in the operation of a VLSI basic processing unit.

SUMMARY OF THE INVENTION

Briefly, these and other objects of the invention are achieved in a VLSI CPU incorporating a BPU which includes an address and execution (AX) unit, a decimal numeric (DN) unit and a floating point (FP) unit and also incorporating a cache unit situated logically intermediate the BPU and system memory, by duplicating each of the AX, DN and FP chips (i.e., duplicating the BPU) and performing all BPU data manipulation operations redundantly. The outputs from the duplicate BPUs are placed on respective master (MRB) and slave (SRB) result busses which are coupled to the cache unit, and the results are compared in the cache unit. If the results are not identical in each byte of the result, the individual chip in the cache unit detecting the no-compare condition issues an error signal, and appropriate steps to remedy or otherwise respond to the error signal may be undertaken.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing, of which:

DETAILED DESCRIPTION OF THE INVENTION

Figures 1, 3:
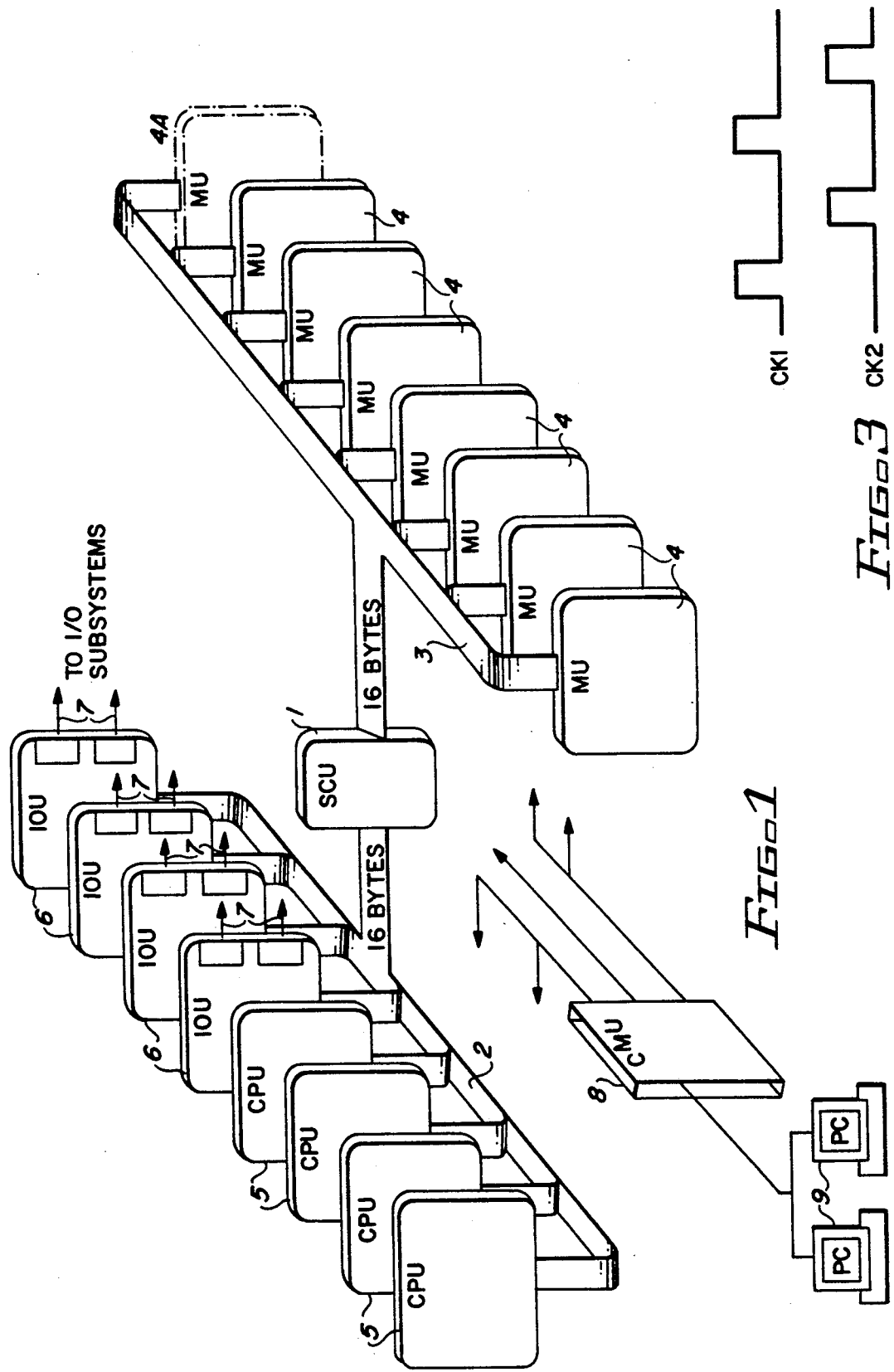
FIG. 1 is a very high level block diagram of the central system structure of an information processing system in which the subject invention finds application.
FIG. 3 a timing diagram illustrating the relationship between CK1 and CK2 timing pulses employed in the CPU and in the subject error detecting logic.

Attention is first directed to FIG. 1 which illustrates an exemplary Central Subsystem Structure (CSS) within which the subject invention may be incorporated. The System Control Unit (SCU) 1 centralizes and controls the system bus 2 and the memory bus 3 scheduling. More particularly, the SCU 1: A) performs memory control, single bit error correction and double bit error detection; B) controls the memory configuration of one or more Memory Unit (MU) 4; C) manages 64-byte block transfers between the Central Processing Units (CPUs) 5 and the MUs in conjunction with the store-into-cache feature of the CPUs; D) corrects single bit errors found in modified blocks of a CPU's cache or on a data transfer from a CPU, MU or Input/Output Unit (IOU) 6; and E) contains the system calender clock.

The system bus 2 interconnects 1 to 4 CPUs and 1 to 4 IOUs with each other and with the SCU. The system bus includes a 16-byte bidirectional data interface, a bidirectional address and command interface, an SCU status interface monitored by all CPUs and IOUs, and a small number of control lines between the SCU and each individual CPU and IOU. Data is exchanged on the system bus in 16, 32 or 64-byte groups, and data exchanges can be between a CPU and an MU, an IOU and an MU, two CPUs and a CPU and an IOU. The operations through the system bus 2 are:

Read: 16, 32 or 64 bytes;
Read with exclusivity: 64 bytes;
Write from IOU: 16, 32 or 64 bytes;
Write from CPU (swapping): 64 bytes;
Interrupts and Connects: Read/Write registers.

Every system bus operation consists of an address phase and a data phase, and an address phase can start every two machine cycles. Consecutive 16-byte data transfers within a group can occur on consecutive machine cycles. An IOU or CPU can wait for the data phase of up to two requests at the same time. The data blocks are transferred in the same order as the requests are received.

The memory bus 3 interconnects 1 to 8 MUs with the SCU. The memory bus includes a 16-byte bidirectional data interface, an address and command interface from the SCU to all MUs and a small number of control lines between the SCU and each individual MU. Data is exchanged on the memory bus in 16, 32 or 64-byte groups. The operations through the memory bus 3 are:
Read: 16, 32 or 64 bytes;
Write: 16, 32 or 64 bytes.

The main memory is composed of up to eight MUs. (A ninth slot, MU 4A, may be provided for ease of reconfiguration and repair in case of failure.) A single bit correction, double bit detection code is stored with every double word; i.e., 8 code bits for every 72 data bits. The code is arranged so that a 4-bit error within a single chip is corrected as four single bit errors in four different words. Data in an MU is addressed from the SCU in 16 byte (four word) increments. All bytes within any one MU are consecutively addressed; i.e., there is no interlace between MUs which operate in parallel. A memory cycle may start every machine cycle, and a memory cycle, as seen from a CPU, is ten machine cycles, assuming no conflicts with other units. An MU 4 contains 160 Dynamic Random Access Memory (DRAM) circuits, each of which has n by 4 bit storage elements where n=256, 1024 or 4096.

The IOUs 6 each provide a connection between the system bus 2 and two Input/Output Buses (IOBs) 7 such that each IOB interfaces with a single IOU. Thus, an IOU manages data transfers between the CSS and the I/O subsystems, not shown in FIG. 1.

A Clock and Maintenance Unit (CMU) 8 generates, distributes and tunes the clock signals for all the units in the CSS, provides the interface between the service processor(s) (SP) 9 and the central processing, input-/output and power subsystems, initializes the units of the CSS and processes errors detected within the CSS units. The CSS employs a two-phase clock system and latched register elements in which the trailing edge of clock 1 defines the end of phase 1, and the trailing edge of clock 2 defines the end of phase two, each phase thus being one-half of a machine cycle.

The SP(s) 9 may be a commodity personal computer with an integrated modem for facilitating remote maintenance and operations, and large systems may include two SPs through which the system can be dynamically reconfigured for high availability. The SP performs four major functions:
monitor and control of the CSS during initialization, error logging or diagnostic operations;
serves as the primary operating system console during system boot or on operator command;
serves as console and data server for the input/output subsystems Maintenance Channel Adaptor (MCA);
provides a remote maintenance interface.

Figure 2:
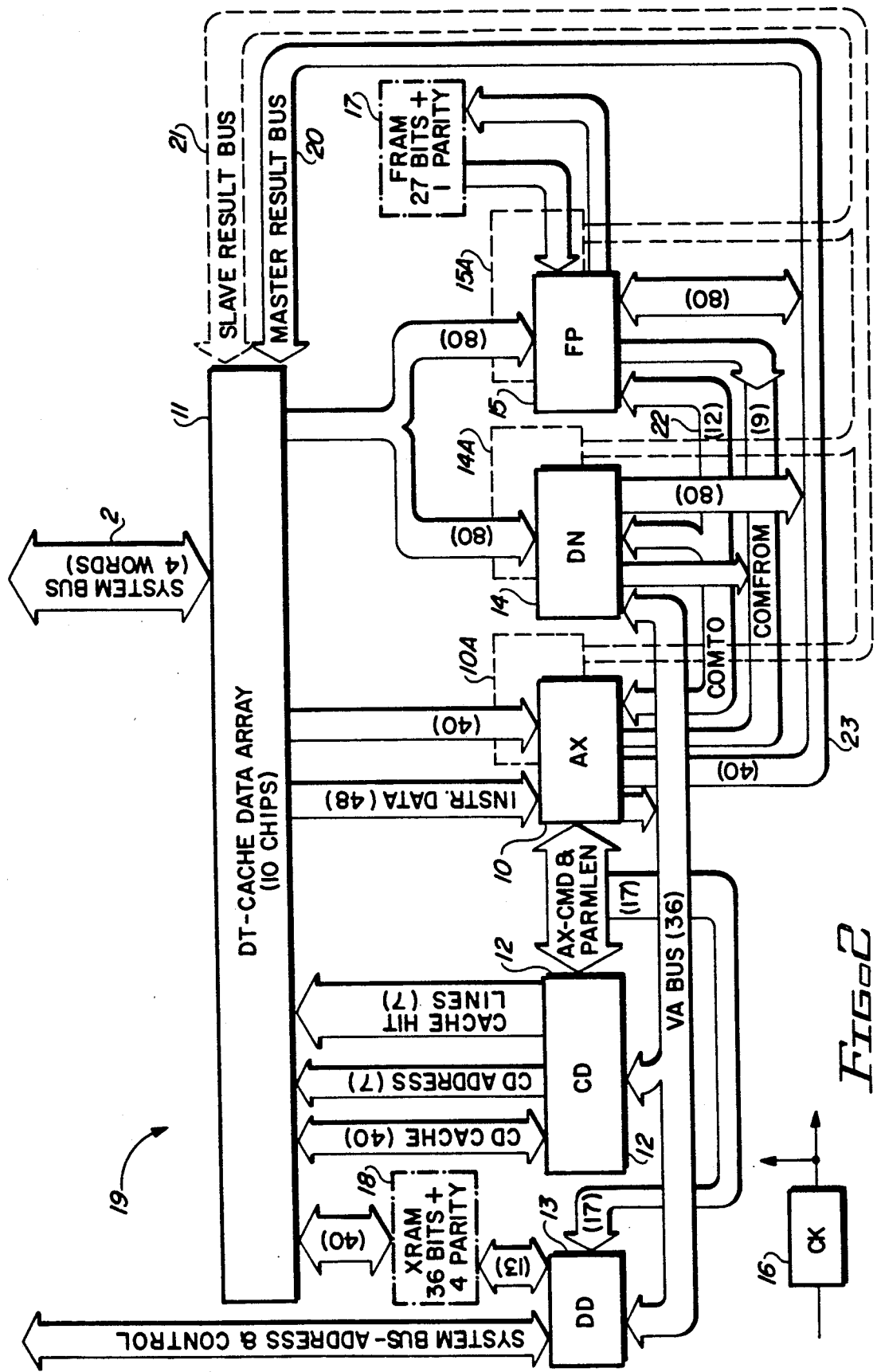
FIG. 2 is a general block diagram of the central processing unit of the central system structure of FIG. 1, in which central processing unit the subject invention is employed.

Attention is now directed to FIG. 2 which is a general block diagram of one of the CPUs 5 of FIG. 1. The Address and Execution Unit (AX unit) is a microprocessing engine which performs all address preparation and executes all instructions except decimal arithmetic, binary floating point and multiply/divide instructions. Two identical AX chips 10, 10A perform duplicate actions in parallel, or execute the same instruction concurrently and the resulting AX chip outputs are constantly compared to detect errors. The structure of the AX chip will be described in more detail below. The main functions performed by the AX unit include:
effective and virtual address formation;
memory access control;
security checks;
register change/use control;
execution or basic instructions, shift instructions, security instructions, character manipulation and miscellaneous instructions.

The cache unit 11 includes a data part, or cache random access memory (RAM), of 64K bytes (16K words) and a set associative directory part which defines the main memory location of each 64-byte (16-word) block stored in the cache data part. Physically, the cache unit is implemented in an array of ten Data (DT) chips 11, a cache directory (CD) chip 12 and a duplicate directory (DD) chip 13. Each of the DT, CD and DD chips will be described in more detail below.

The specific functions performed by the DT chip array 11 include:
combined instruction and operand data storage;
instruction and operand buffering and alignment;
data interface with the system bus 2 (FIG. 1);
CLIMB safestore file.

The cache write strategy is "store into". If a longitudinal parity error is detected when reading a portion of a modified block from the cache, the block will be swapped out of the cache, corrected by the SCU and written into main memory. The corrected block will then refetched from main memory.

Two copies of the cache directory information are respectively maintained in the CD and DD chips which perform different logic functions. The two directory copies allow interrogation of the cache contents from the system bus in parallel and without interference with instruction/operand access from the CPUs and also provide for error recovery. Functions performed by the CD chip 12 include:
cache directory for CPU accesses;
instruction, operand and store buffer management;
virtual-to-real address translation paging buffer.

Functions performed by the DD chip 13 include:
cache directory for system accesses;
system bus control;
distributed connect/interrupt management;
cache directory error recovery.

Efficient scientific calculation capability is implemented on the Floating Point (FP) chips 15, 15A. The identical FP chips execute all binary floating point arithmetic instructions in duplicate. These chips, operating in concert with the duplicate AX chips 10, 10A, perform scalar or vector scientific processing.

The FP chip 15 (duplicated by the FP chip 15A):
executes all binary and fixed and floating point multiply and divide operations;
computes 12 by 72-bit partial products in one machine cycle;
computes eight quotient bits per divide cycle;
performs modulo 15 residue integrity checks.

Functions performed by the FP chips 15, 15A include:
executes all floating point mantissa arithmetic instructions except multiply and divide;
executes all exponent operations, or instructions in either binary or hexadecimal format;
preprocesses operands and postprocesses results for multiply and divide instructions;
provides indicator and status control.

Two special purpose random access memories (FRAM 17 and XRAM 18) are incorporated into the CPU. The FRAM chip 17 is an adjunct to the FP chips 15, 15A and functions as an FP control store and decimal integer table lookup. The XRAM chip 18 is an adjunct to the AX chips 10 10A and serves as a scratchpad as well as providing safestore and patch functions.

The CPU also employs a Clock Distribution (CK) chip 16 whose functions include:
- clock distribution to the several chips constituting the CPU;
- shift path control;
- maintenance;
- interface between CMU and CPU;
- provision of clock stop logic for error detection and recovery.

Referring briefly to FIG. 3, it will be seen that the CK chip 16 issues two staggered clock streams, CK1 and CK2, which do not overlap.

The Decimal Numeric (DN) chip 14 (in parallel with the DN chip 14A) performs the execution of the decimal numeric Extended Instruction Set (EIS) instructions. It also executes the Decimal-to-Binary (DTB), Binary-to-Decimal (BTD) conversion EIS instructions and Move-Numeric-Edit (MVNE) EIS instructions in conjunction with the AX chip 10. The DN chip both receives operands from memory and sends results to memory via the cache unit 11.

The AX, DN and FP chips, collectively, are sometimes referred to as the Basic Processing Unit (BPU) 19. It was previously noted that the AX, DN and FP chips were duplicated with the duplicate units operating in parallel to obtain duplicate results which are available for integrity checking. (The unit pairs are respectively named the AX unit, the DN unit and the FP unit for convenience.) Thus, master and slave results are obtained in the normal operation of these chips. The master results are placed onto a Master Result Bus (MRB) 20 while the slave results are placed onto a Slave Result Bus (SRB) 21. Both the master and slave results are conveyed, on the MRB and SRB respectively, to the cache data array 11 comprised of ten of DT chips. The purposes of this arrangement will be described more fully below. In addition, a COMTO bus 22 and a COMFROM bus 23 couple together the AX unit, the DN unit and the FP unit for certain interrelated operations as will also be described more fully below.

The AX unit 10, DN unit 14 and FP unit 15, communicating with one another via the COMTO bus 22 and COMFROM bus 23 accept data manipulation instructions and operands from the cache unit 11 and deliver the results back to the cache unit via the MRB 20. Redundantly, the secondary AX unit 10A, the secondary DN unit 14A and the secondary FP unit 15A (intercommunicating on their own COMTO and COMFROM busses, not shown in FIG. 2) accept the same data manipulation instructions and operands from the cache unit 11 and deliver the results back to the cache unit via the SRB 21. Thus, the results appearing at a given time on the MRB and SRB should always be identical, and if they are not, a basic processing error will have occurred.

Figure 4:
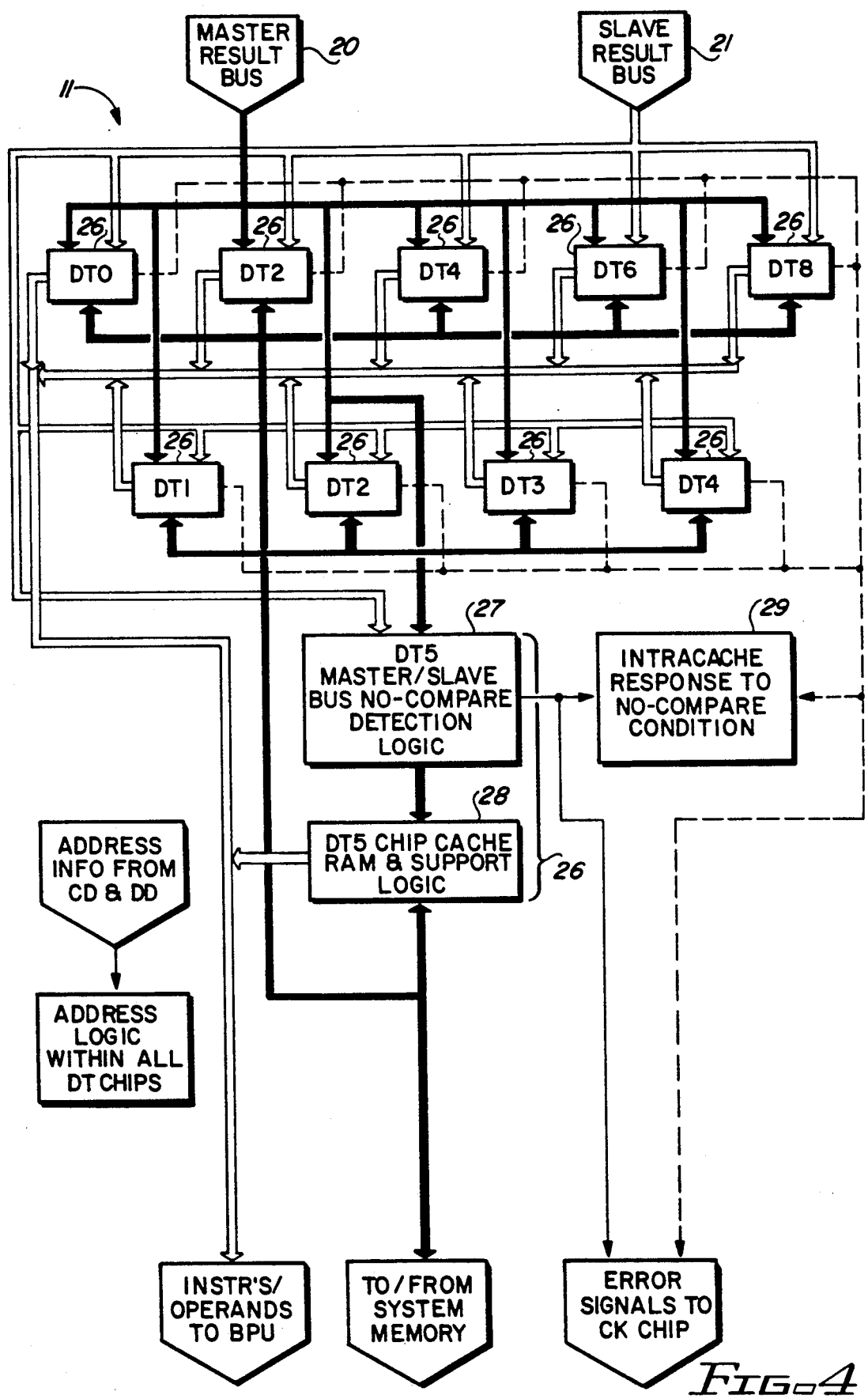
FIG. 4 is a block diagram of the cache unit illustrating the relationship among the ten Data (DT) chips therein.

Attention is now directed to FIG. 4 which is a block diagram of the major portion of the cache unit 11 in which certain errors which have occurred within the BPU are detected. In the illustrative embodiment, the storage facility of the cache unit is subdivided into ten Data (DT) chips 26, DT0–DT9, which each process and cache-store one eight-bit byte such that, as indicated in FIG. 2, up to eighty bits from each of the MRB and SRB may be handled in parallel by the cache unit. Thus, eight bits (which should be identical) from each of the MRB and the SRB are applied as inputs to DT0, another set of eight bits (which should be identical) from each of the MRB and the SRB are applied as inputs to DT1, and so on through DT9.

DT5, merely by way of example, is broken down into two major blocks 27, 28 to demonstrate that, while data from both the MRB and the SRB are applied as inputs, only the data from the MRB (if legitimate) is delivered to the cache RAM storage block 28 of the DT5 chip. In addition, the cache RAM 28 communicates with system memory and also, in response to address information received from the CD and DD chips, delivers instructions and operands to the BPU (and secondary BPU), thereby performing the normal functions of a cache memory.

If, for example in the byte handled by the DT5 chip, a no-compare is sensed between the data received from the MRB and SRB, respectively, an error signal (individual to DT5) to that effect is sent to the appropriate error handling facility in the CPU which, in the exemplary embodiment, is under the control of the CK chip 16. Similarly, intracache response to the sensed error may be undertaken by block 29.

Figure 5:
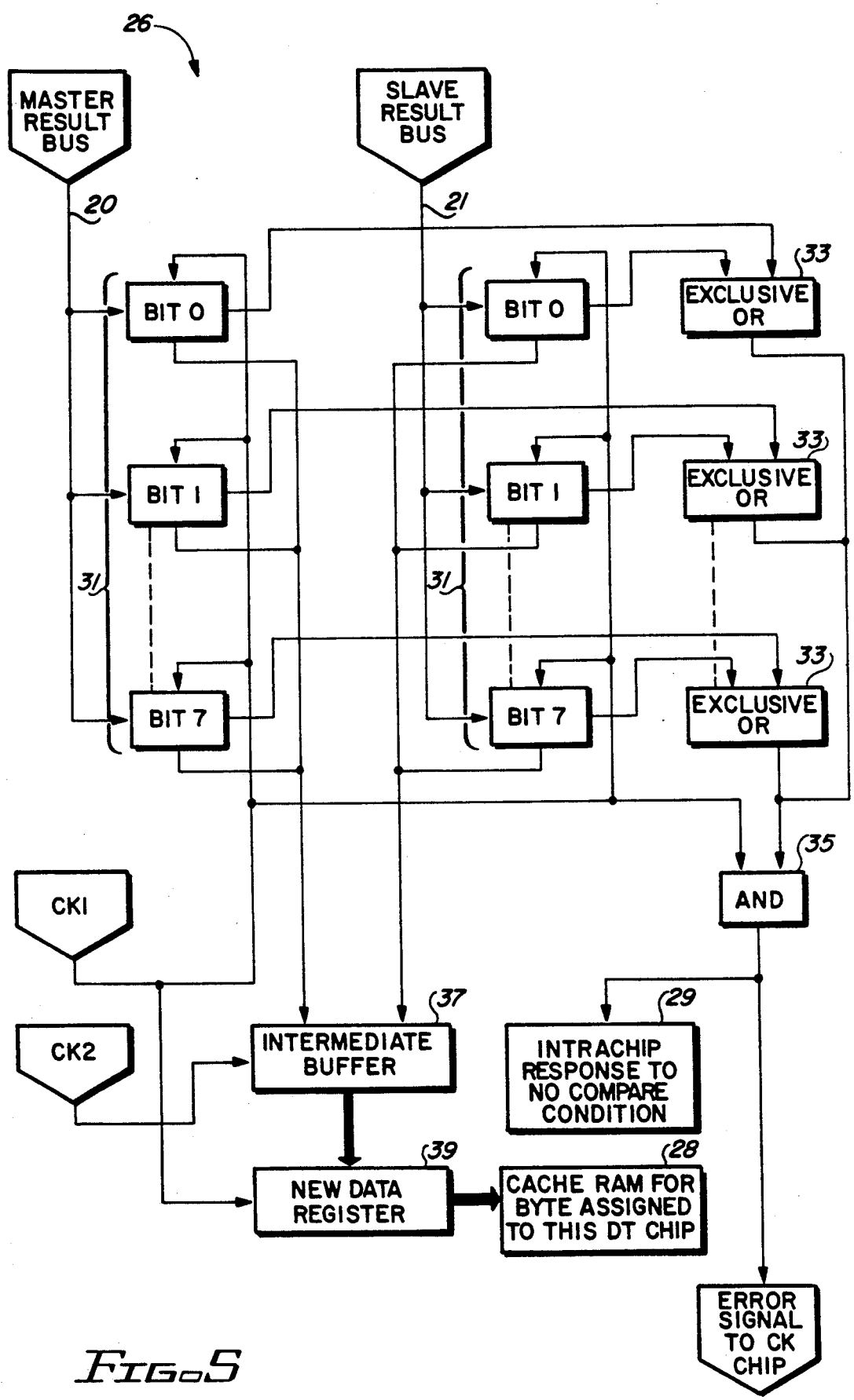
FIG. 5 is a block diagram of one of the DT chips of the cache unit more particularly illustrating the error detection logic of the subject invention.

It will be understood that each of the DT chip 26 in the cache unit is capable of generating an independent error signal which is conveyed to the CK chip to institute error handling. The manner in which a no-compare condition is sensed may be best appreciated with reference to FIG. 5. The eight bits (0-7) received by an individual DT chip from each of the MRB and the SRB are entered into separate banks of an entry buffer 31 upon the occurrence of CK1. (To avoid unnecessary repetition in FIG. 5, bits 2-6 in each bank of the entry buffer are represented by dashed lines.) A signal representing the state of each bit storage element is applied as an input to one of a series of EXCLUSIVE-OR (XOR) gates 33 in a pattern wherein the redundant bit 0s supplied by the MRB and SRB, respectively, are applied to a first XOR-gate, the redundant bit 1s supplied by the MRB and SRB are applied to a second XOR-gate, etc. Thus, a bit by bit comparison of the eight-bit byte handled by the individual DT chip 26 is achieved. The outputs of all the XOR-gates are 33 tied together such that a logic "1" observed at the common output indicates the presence of a no-compare condition somewhere within the byte. Since the other bytes of the result are being simultaneously checked in the other DT chips, the entire result is therefore examined for a no-compare condition.

The common output from the bank of XOR-gates is applied to one input of an AND-gate 35 which has its other input driven by CK1 such that an error signal is sent to the CK chip upon the concurrence of a no-compare condition and a clock pulse CK1. It will be noted that each DT chip has an individual error line communicating with the CK chip. However, the fact that this signal is sent to the CK chip is indicative only of the specific embodiment chosen for illustration. In a given system, the error signal may be sent to whatever hardware, firmware and/or software stratagem has been provided to service sensed BPU failures. The error signal may also be used internally within the cache unit to take such steps as locking out and/or in information temporarily stored in the cache or ancillary structure to assist in diagnosing the error, retrying, restarting, etc.

Upon the occurrence of CK2, the information (both master and slave results) stored in the entry buffer is transferred to an Intermediate Buffer 37. On the next CK1, assuming that the results successfully compared, the master results only are transferred to a New Data Register 39 from which the eight valid bits may be routinely stored into the cache RAM 28 incorporated into the individual DT chip. However, one possible response by the CK chip to a sensed no-compare condition is to inhibit the next CK1 signal which would leave the contradictory bytes resident in the Intermediate Buffer for examination and analysis.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A central processing unit of a data processing system comprising:

first basic processing unit means for executing computer instructions and producing a result for each computer instruction executed;

second basic processing unit means for executing computer instructions and producing a result for each computer instruction executed; the first and second basic processing unit means concurrently executing the same computer instruction and producing the result of the execution of the same computer instruction concurrently;

a cache unit, said cache unit including random access memory means for storing one of the two concurrently produced results produced by the basic processing unit means as a result of the execution of the same computer instruction by the first and second basic processing unit means;

first result bus means for transmitting the result of the execution of each computer instruction by the first basic processing unit means to the cache unit;

second result bus means for transmitting the result of the execution of each computer instruction by the second basic processing unit means to the cache unit; the first and second result bus means transmitting the results of the execution of the same computer instruction by the first and second basic processing unit means to the cache unit concurrently;

the cache unit further including buffer means for temporarily storing the results of the concurrent execution of the same instruction by the first and second basic processing unit means transmitted to the cache unit by the first and second result bus means; and means for comparing the results temporarily stored in the buffer means at the same time and for producing an error signal if the results stored in the buffer means at the same time do not compare; the result of one of the basic processing unit means stored in the buffer means at the same time being stored into the random access memory means of the cache unit if no error signal is produced by the means for comparing.

2. The central processing unit of claim 1 in which the first and second basic processing units are substantially identical.

3. The central processing unit of claim 2 in which the first and second basic processing units each comprise an address and execution unit, a decimal numeric unit, and a floating point unit.

4. The central processing unit of claim 2 in which the result produced by the execution of a computer instruction consists of "n" bytes of a given number of bits, where "n" is an integer greater than zero, and the cache unit comprises "n" 60 subdivisions, each of the subdivisions of the cache unit including buffer means into which a byte of result transmitted by the first result bus means and a corresponding byte transmitted by the second result bus means to the cache unit are temporarily stored, and each of the subdivisions of the cache means including means for comparing the bits of the bytes temporarily stored in the buffer means of each subdivision of the cache means at any one time.

5. The central processing unit of claim 4 in which "n" equals 10.

6. The central processing unit of claim 5 in which each subdivision of the cache unit is implemented on a single very large scale integrated chip.

7. In a central processing unit of a data processing system including a master and a slave basic processing unit means for executing computer instructions and producing a master result and a slave result respectively from the execution of the same instruction by the master and the slave basic processing units at substantially the same time, the master and slave basic processing unit means being substantially identical to each other; the master and slave results each having a predetermined number of bytes with each byte having a given number of bits; and a store into cache means having predetermined number of subdivisions; wherein the improvements comprise:

master result bus means for interconnecting the master basic processing unit means and the cache means, and for transmitting to the cache means a master result produced by the master basic processing unit means;

slave result bus means for interconnecting the slave basic processing unit means and the cache means, and for transmitting to the cache means a slave result produced by the slave basic processing unit means, said master and slave result bus means transmitting the master and slave results from the execution of the same computer instruction by the master and slave basic processing unit means to the cache means substantially concurrently;

each of the subdivisions of the cache means including buffer means for temporarily storing a corresponding byte of the master result, a master byte, and a corresponding byte of the slave result, a slave byte; each of the subdivisions of the cache means further including means for comparing the master and slave bytes temporarily stored by the buffer means of each subdivision of the cache means at the same time and for producing an error signal if the bits of corresponding master and slave bytes stored in the buffer means of each subdivision of the cache means at any one time do not compare; and each subdivision of the cache means also including cache ram means for storing the master byte temporarily stored in the buffer means of each subdivision of the cache means if no error signal is produced by any of the means for comparing of any of the subdivisions of the cache means while comparing corresponding bytes of the master and slave results temporarily stored in said buffer means at the same time.

8. In the central processing unit set forth in claim 7 in which the predetermined number of bytes and subdivisions is 10.

9. In the central processing unit set forth in claim 8 in which each of the subdivisions of the cache means is implemented on a single very large scale integrated chip.

* * * * *